UNITED STATES PATENT OFFICE.

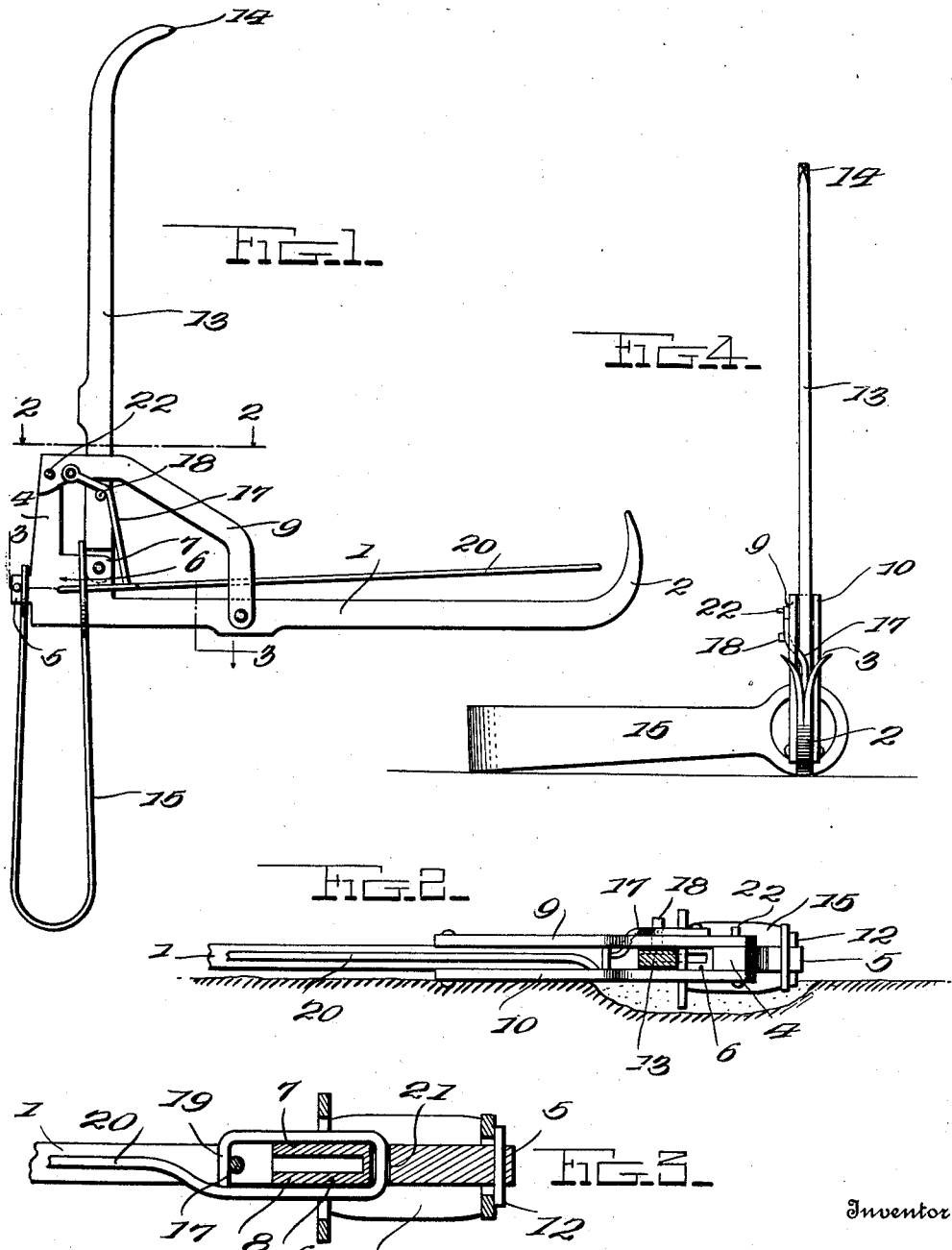

RICHARD JOHNSON, OF ST. PAUL, MINNESOTA, ASSIGNOR OF ONE-HALF TO A. SUDOR, OF ST. PAUL, MINNESOTA.

TRAP.

1,099,805. Specification of Letters Patent. Patented June 9, 1914.

Application filed November 10, 1913. Serial No. 800,200.

*To all whom it may concern:*

Be it known that I, RICHARD JOHNSON, a citizen of the United States, residing at St. Paul, in the county of Ramsey and State of Minnesota, have invented certain new and useful Improvements in Traps; and I do declare the following to be a full, clear, and exact description of the invention, such as will enable others skilled in the art to which it appertains to make and use the same.

This invention relates to new and useful improvements in traps and more particularly to that class adapted to be used in catching rodents and other animals, and one object of the same is to provide a device of this class whereby the jaws of the trap may be set in either a horizontal or vertical position.

A further object is to provide a novel trigger mechanism for holding the jaws in a set position, and a still further object is to provide means for retaining said jaws in the same plane.

These and other objects and advantages will be hereinafter referred to and more particularly pointed out in the claims.

In the accompanying drawings: Figure 1 is a plan view of my trap showing the same in an open or set position. Fig. 2 is a horizontal section taken on the line 2—2 of Fig. 1 with the trap disposed in a horizontal position. Fig. 3 is a detail sectional view taken on the line 3—3 of Fig. 1. Fig. 4 is an end elevation of my trap with the spring thereof set at right angles and supporting said trap in a vertical position.

Referring more particularly to the drawings, 1 designates the stationary jaw of the trap, 2 the inwardly curved outer end thereof, which latter is notched as at 3, for a purpose hereinafter to be described. On the other end of the jaw 1 is a laterally projecting arm 4 and a rearwardly projecting stud 5, the latter being disposed in alinement with the jaw 1. On the inner side of the arm 4 at the junction of said arm and jaw 1 is a shoulder 6, the outer portion of which is bifurcated to form the bearing members 7 and 8. Pivotally mounted at its lower end in the bearings 7 and 8 is a movable arm 13 which is provided at its opposite end with an inwardly curved prong 14 adapted to enter the notch 3 when said jaw has been actuated to a closed position. In order that the jaw 13 may be always maintained in alinement with the jaw 1, I provide the guiding plates 9 and 10 which inclose the jaw 13 and are pivotally connected at one end to opposite sides of the upper end of arm 4, the other ends thereof being secured to opposite sides of the jaw 1.

To force the jaw 13 into contact with jaw 1, I employ a substantially U-shaped spring 15 having the free ends thereof apertured. One end of said spring is pivotally mounted over the shoulder 6 and jaw 1 and disposed intermediate the arm 4 and the movable jaw 13, while the other end is pivotally mounted on the afore-mentioned lug 5 and retained in this position by the pin 12. By pivotally mounting the spring 15 in the manner described, I am enabled thereby to not only utilize the stress of said spring to actuate the jaw 13 to a closed position, but I am enabled to also use it as a support, whereby if occasion should ever arise in which it is desirable that the trap be disposed in a vertical position, I would merely have to rotate the spring 15 to a plane substantially at right angles to that of the jaw 13, thus making a support of said spring and holding the trap in the desired position.

To retain the jaw 13 in an open position, as well as to provide means whereby the same may be released, I employ a spring 17 which is pivotally mounted at one end on the outer side of a guiding plate 9, and so disposed as to engage the laterally projecting stud 18 on the inner side of jaw 13. The free end of the spring 17 is engaged by the inturned end 19 of a trigger 20 which is disposed immediately above the jaw 1 and extends rearwardly to the opening 21, said trigger rod is then right angularly bent and passed through said opening, after which it is again bent to a position parallel to the portion on the opposite side of opening 21 and brought forwardly to a position slightly in advance of shoulder 6 and provided with the inturned end 19 for the purpose hereinbefore described. The spring 17, after releasement by the trigger 20 is returned to its normal position by the stop 22 formed on the outer side of plate 9.

In setting my trap the jaw 13 is swung outwardly which will therefore depress one end of the spring 15. The spring 17 is then passed over the stud 18 and brought into engagement with the inturned end 19 of the trigger 20, thus holding the arm 13 in an open or set position, and retaining one end of spring 15 in its depressed condition.

When my trap has been set in the manner described, an animal moving across the same and actuating the trigger 20 would disengage the end 19 from the lower end of spring 17 thereby releasing the same and permitting the jaw 13 to be quickly thrown, under the influence of spring 15, against the body of the animal between the jaws, thus imprisoning said animal, or if the prong 14 happens to enter its body, killing it instantly.

While I have described my invention with more or less minuteness as regards details and as being embodied in certain precise forms, I do not desire to be limited thereto unduly any more than is pointed out in the claims. On the contrary, I contemplate all proper changes in form, construction and arrangement, the omission of immaterial elements and substitution of equivalents, as circumstances may suggest or render expedient.

I claim as my invention:—

1. In a trap of the character described, the combination of a stationary jaw, a laterally projecting arm at one end thereof, a rearwardly extending lug at the base of said arm, guiding means connecting said jaw and said arm, a movable jaw disposed between said guiding means and pivotally connected to said stationary jaw adjacent the arm thereon, a trigger mechanism to retain said movable jaw in an open position, a substantially U-shaped jaw actuating spring rotatably mounted on said stationary jaw, said spring having one end interposed between said arm and said movable jaw, and the opposite end thereof rotatably mounted on said lug, whereby said spring may be rotated to support said trap in a vertical position.

2. In a trap of the character described, the combination of a stationary jaw having the outer end thereof inturned and notched, a laterally projecting arm on the opposite end of said jaw, guiding plates arranged in parallel relation and having one of their ends connected to said arm and the opposite ends connected to said stationary jaw, a movable jaw disposed between said guiding plates, said movable jaw having one end thereof pivotally connected to said stationary jaw adjacent the arm thereon, the other end having an inwardly projecting prong thereon adapted to enter the notched end of said stationary jaw, a trigger mechanism to retain said movable jaw in an open position, a substantially U-shaped jaw actuating spring rotatably mounted on said stationary jaw, said spring having one end interposed between said arm and said movable jaw, and the opposite end thereof rotatably mounted on said lug, whereby said spring may be rotated to support said trap in a vertical position.

3. In a trap of the character described, the combination of a stationary jaw, a laterally projecting arm formed at one end thereof, guiding plates connecting said arm and said jaw, a movable jaw disposed between said plates and pivotally connected to said stationary jaw, a jaw retaining spring pivotally connected to one of said plates, means on said movable jaw adapted to be engaged by said spring, a trigger pivotally mounted at the inner end of said stationary jaw, a catch formed on the inner end of said trigger, the latter being adapted to engage the free end of said spring whereby said jaw may be retained in open position and a spring rotatably mounted on one end of said stationary jaw, and adapted to actuate said movable jaw to a closed position.

In testimony whereof I have hereunto set my hand in presence of two subscribing witnesses.

RICHARD JOHNSON.

Witnesses:
ANTHONY SUDAR,
JENNETTE M. DAILEY.

---

Copies of this patent may be obtained for five cents each, by addressing the "Commissioner of Patents, Washington, D. C."